United States Patent
Purkayastha et al.

(10) Patent No.: US 9,747,228 B2
(45) Date of Patent: Aug. 29, 2017

(54) CACHING SYSTEMS AND METHODS FOR EXECUTION WITHIN AN NVDRAM ENVIRONMENT

(71) Applicant: Avago Technologies General IP (Singapore) Pte. Ltd, Singapore (SG)

(72) Inventors: Saugata Das Purkayastha, Bangalore (IN); Kishore Kaniyar Sampathkumar, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 433 days.

(21) Appl. No.: 14/323,079

(22) Filed: Jul. 3, 2014

(65) Prior Publication Data
US 2016/0004653 A1    Jan. 7, 2016

(51) Int. Cl.
*G06F 13/36*   (2006.01)
*G06F 13/28*   (2006.01)
*G06F 13/42*   (2006.01)
*G06F 12/02*   (2006.01)
*G06F 13/16*   (2006.01)

(52) U.S. Cl.
CPC .......... *G06F 13/28* (2013.01); *G06F 12/0238* (2013.01); *G06F 13/1694* (2013.01); *G06F 13/4221* (2013.01); *G06F 2212/202* (2013.01)

(58) Field of Classification Search
USPC .......... 710/306–315, 104–110; 711/133–136
See application file for complete search history.

(56) References Cited

U.S. PATENT DOCUMENTS

| 7,319,613 | B2 | 1/2008 | Forbes |
| 8,402,226 | B1 | 3/2013 | Faibish et al. |
| 8,555,000 | B2 * | 10/2013 | Jo .......................... G06F 12/126 711/103 |
| 8,576,628 | B2 | 11/2013 | Ueda |
| 9,355,023 | B2 * | 5/2016 | Badam ................ G06F 12/0246 |
| 9,355,036 | B2 * | 5/2016 | Beard ................ G06F 17/30132 |
| 2006/0215452 | A1 | 9/2006 | Forbes |
| 2010/0023682 | A1 | 1/2010 | Lee et al. |
| 2012/0026794 | A1 | 2/2012 | Lueng |
| 2013/0111160 | A1 | 5/2013 | Benhase et al. |
| 2013/0166834 | A1 | 6/2013 | Mayhew et al. |

(Continued)

OTHER PUBLICATIONS

Official Action for U.S. Appl. No. 14/333,321, dated Apr. 12, 2017, 17 pages.

*Primary Examiner* — Raymond Phan
(74) *Attorney, Agent, or Firm* — Sheridan Ross P.C.

(57) ABSTRACT

Systems and methods presented herein provide for simulated NVDRAM operations. In a host system, a host memory is sectioned into pages. An HBA in the host system comprises a DRAM and an SSD for cache operations. The DRAM and the SSD are sectioned into pages and mapped to pages of the host memory. The SSD is further sectioned into regions comprising one or more pages of the SSD. An HBA driver is operable to load a page of data from the SSD into a page of the DRAM when directed by a host processor, to determine that the page of the DRAM is occupied with other data, to determine a priority of the region of the page of other data occupying the page of the DRAM, and to flush the other data from the DRAM to the SSD based on the determined priority.

20 Claims, 7 Drawing Sheets

(56) References Cited

U.S. PATENT DOCUMENTS

| | | | |
|---|---|---|---|
| 2013/0268727 A1* | 10/2013 | Sohn | G11C 8/00 711/105 |
| 2014/0029340 A1 | 1/2014 | Wang | |
| 2014/0258595 A1* | 9/2014 | Venkatesha | G06F 9/5016 711/103 |
| 2015/0193144 A1* | 7/2015 | Bilas | G06F 3/064 711/103 |
| 2015/0220452 A1* | 8/2015 | Purkayastha | G06F 12/1009 711/103 |
| 2016/0188410 A1* | 6/2016 | Lee | G06F 11/1028 714/6.24 |

* cited by examiner

FIG. 4

| 321 | 322 |
|---|---|
| <Region Range 0> | <Priority Level 1> |
| <Region Range 1> | <Priority Level 2> |
| <Region Range 2> | <Priority Level 3> |
| <Region Range 3> | <Priority Level 4> |
| ⋮ | ⋮ |
| <Region Range N> | <Priority Level N+1> |

CACHING SYSTEMS AND METHODS FOR EXECUTION WITHIN AN NVDRAM ENVIRONMENT

BACKGROUND

Non-Volatile Dynamic Random Access Memory (NVDRAM) is a combination of volatile memory and non-volatile memory, such as a Solid State Device (SSD), manufactured on a single device. The non-volatile memory acts as a shadow memory such that data stored in the volatile memory is also stored in the non-volatile memory. And, when power is removed from the device, the data of non-volatile portion of the NVDRAM remains even though the data in the DRAM is gone. Other implementations of SSD backed DRAM on separate devices are used when host system application capacity requirements are relatively small. However, in a Host Bus Adapter (HBA) physical NVDRAM and SSD backed DRAM options are generally not practical due to DRAM size limitations, power consumptions, and the like.

SUMMARY

Systems and methods presented herein provide for simulated NVDRAM operations. In a host system, a host memory is sectioned into pages. An HBA in the host system comprises a DRAM and an SSD for cache operations. The DRAM and the SSD are sectioned into pages and mapped to pages of the host memory. The SSD is further sectioned into regions comprising one or more pages of the SSD. An HBA driver is operable to load a page of data from the SSD into a page of the DRAM when directed by a host processor, to determine that the page of the DRAM is occupied with other data, to determine a priority of the region of the page of other data occupying the page of the DRAM, and to flush the other data from the DRAM to the SSD based on the determined priority.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 4 is an exemplary table of region priorities of the memory maps.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
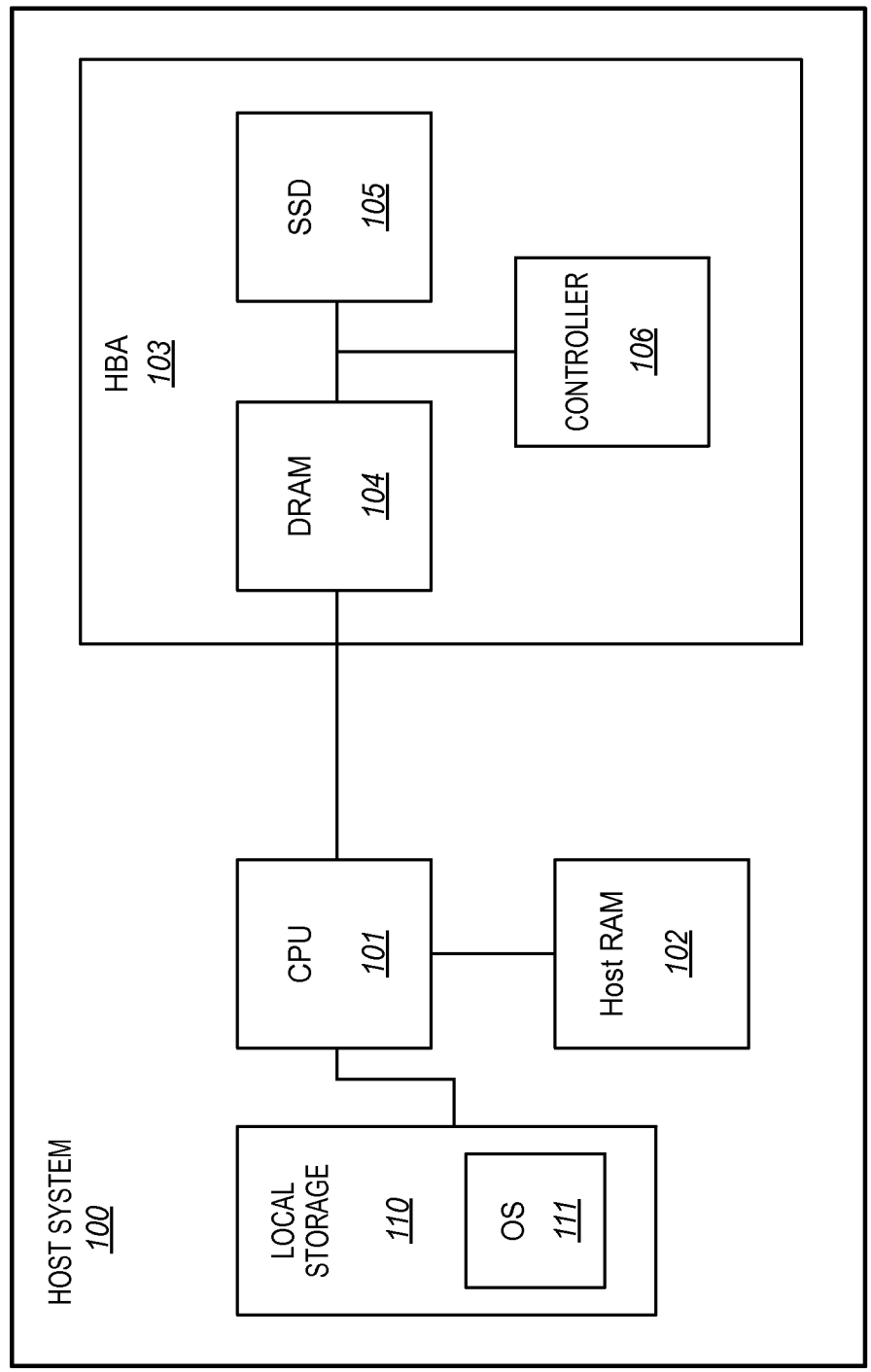
FIG. 1 is a block diagram of a host system employing an HBA for storage operations.

FIG. 1 is a block diagram of a host system 100 employing an HBA 103 for storage operations. The host system 100, as is typical with most processing systems, comprises a central processing unit (CPU) 101 (also referred to as the host processor), host random access memory (RAM) 102, and local storage 110 (e.g., a local disk drive, SSD, or the like) comprising an operating system 111. The HBA 103 comprises a DRAM 104 that is backed by an SSD 105. The HBA 103 also comprises a controller 106 that is operable to, among other things, direct storage operations on behalf of the HBA 103. Thus, the HBA 103 is any device, system, software, or combination thereof operable to perform storage operations on behalf of the host system 100.

The CPU 101 is communicatively coupled to the HBA 103 through the DRAM 104 to map the SSD 105 to the host RAM 102 such that applications of the operating system 111 can directly access cached data of the HBA 103. For example, the operating system 111 comprises applications that are used by the host system 100 to perform a variety of operations. Some of those applications may be used to access data cached within the DRAM 104 of the HBA 103. And, the DRAM 104 is backed by the SSD 105 so the mapping allows the host RAM 102 to access data cached therewith and/or to store data therewith.

In this embodiment, the applications of the operating system 111 are operable to map large chunks of data cached in the SSD 105 of the HBA 103 to a virtual address space in the DRAM 104. Physically, the CPU 101 accesses the DRAM 104 over a memory bus or other I/O bus as with typical NVDRAM. But, in this "extended NVDRAM" embodiment, those operations are implemented with a driver in the operating system 111 (referred to herein as an HBA/extended NVDRAM driver).

The SSD 105 is divided into a plurality of regions, each region being operable to fit within the size of the DRAM 104. Based on the locality of the host application, one or more regions can be loaded into the DRAM 104 and host page tables are thus made to point to the regions which are available in pages of the DRAM 104. The regions are prioritized by the operating system 111 applications such that regions are removed, or "flushed", from the DRAM 104 to the SSD 105 such that other regions can be loaded from host RAM 102 to the DRAM 104, and vice versa, bypassing the operating system 111 and any protocol stacks (e.g., Small Computer Interface System "SCSI", Serial Attached SCSI "SAS", etc.).

Figure 2:
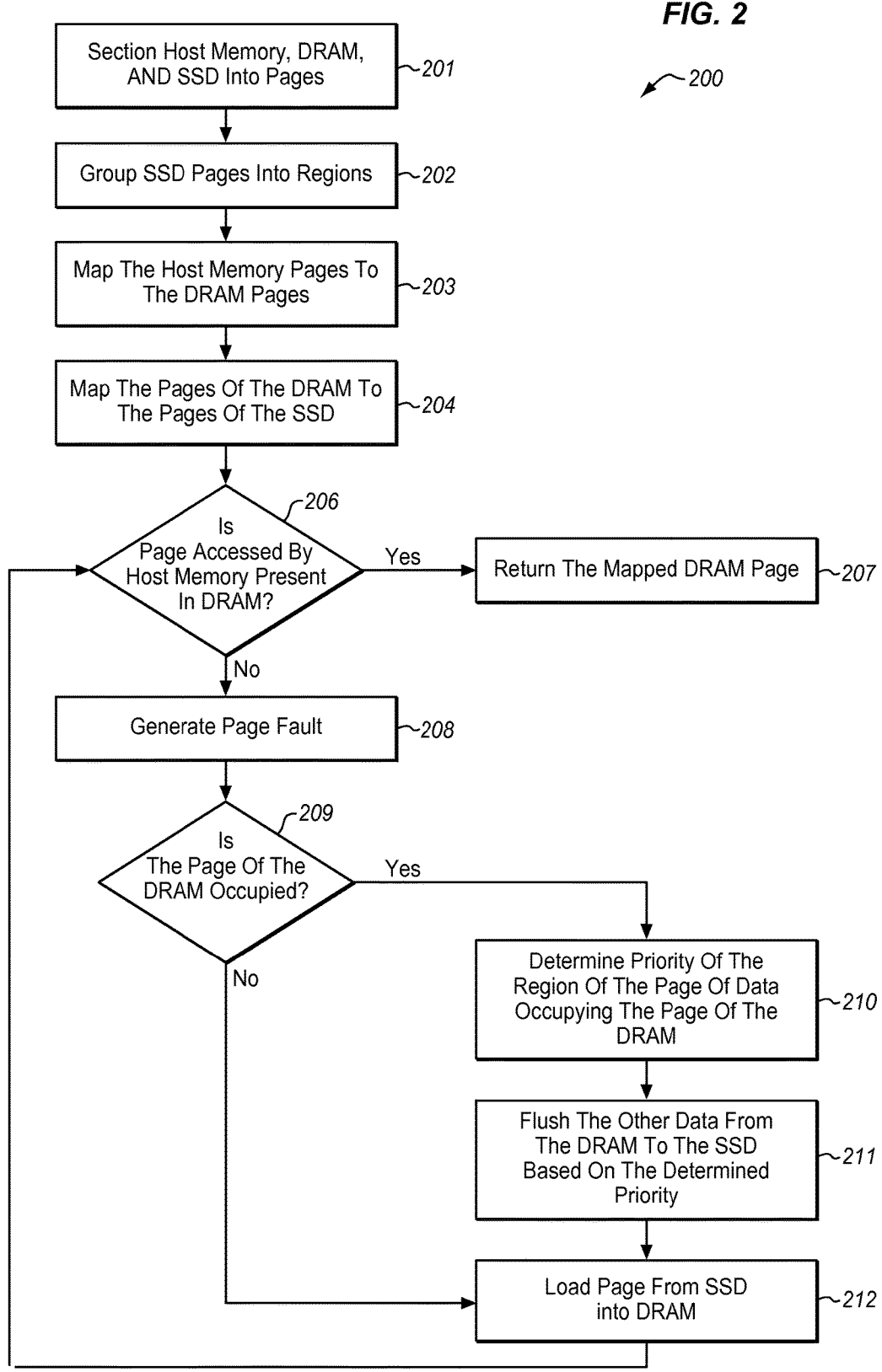
FIG. 2 is a flowchart illustrating an exemplary process of the host system of FIG. 1.

The embodiments herein provide certain advantages for journal and database log applications of the host system 100 that sequentially access pages of the DRAM 104. These and other advantages will become readily apparent in the following drawings and descriptions. Exemplary mapping and region flushing operations of the host system 100 are now shown and described with respect to the flowchart 200 of FIG. 2.

The process of the flowchart 200 initiates with the sectioning and mapping of pages and regions of the host RAM 102, the DRAM 104, and the SSD 105. For example, in the process element 201, each of the host RAM 102, the DRAM 104, and the SSD 105 are sectioned into pages for storing data. The pages of the SSD 105 are also grouped into regions, in the process element 202. Generally, any given region in the SSD 105 comprises one or more pages of the SSD 105. In the process element 203, pages of the host RAM 102 are mapped to the pages of the DRAM 104. And, the pages of the DRAM 104 are mapped to the pages of the SSD, in the process element 204. The SSD 105 generally comprises much more storage space than that of the DRAM 104. Accordingly, the regions are given priorities such that they can be loaded within and flushed from the DRAM 104 based on priority to accommodate the storage size differential.

When an application of the host system 100 requires data cached in the HBA 103, the CPU 101 attempts to locate the page in the DRAM 104, in the process element 206. For example, the DRAM 104, being mapped to the SSD 105, operates as a window to the SSD 105 through which the CPU 101 retrieves cached data. In doing so, however, the page of data may not be present in the DRAM 104 (i.e., the process element 206), causing the operating system 111 to generate a page fault, in the process element 208. Otherwise, the page of data is already available in a mapped page of the DRAM 104, and hence is just returned to the caller in the process element 207 without requiring any further access to SSD 105.

Returning to the page fault scenario of the process element 208, the CPU 101 (e.g., via the HBA/extended NVDRAM driver in the operating system 111) determines whether the page being accessed in the DRAM 104 is occupied, in the process element 209. If the page is not occupied, the CPU 101 loads the requested page from the SSD 105 into the DRAM 104, in the process element 212. Otherwise, the CPU 101 determines priorities of the regions occupying the pages of the DRAM 104, in the process element 210. As mentioned, the SSD 105 is sectioned into one or more regions with each region comprising one or more pages. Each region may be designated with a particular priority level. Since the DRAM 104 operates as a window to the SSD 105, the CPU 101 can identify the region of a page where a load is being attempted and thus determine its priority. From there, the CPU 101 may direct the DRAM 104 to flush the data of that occupied page to the SSD 105 based on the determined priority, in the process element 211. The CPU 101 then executes the process element 212 to load the requested page from the SSD 105 into the DRAM 104. After process element 212, once the requested page of data is determined to be available in a mapped page of the DRAM 104 by the process element 206, the mapped page is returned to the caller in the process element 207.

To illustrate, data occupying a page in the DRAM 104 may be in a region of lower priority than a page of data being requested. The CPU 101 may thus determine that the page of data in the DRAM 104 is a lower priority and then direct the DRAM 104 to flush the data to the SSD 105 based on the lower priority of the occupying page. Additional details regarding the mapping and flushing of data pages are now shown and described in FIGS. 3-5.

FIG. 3 is a block diagram illustrating an exemplary mapping between the host RAM 102 and the DRAM 104 of the HBA 103. The SSD 105 of the HBA 103 is split into pages X through (X+M+8) and into the regions 0 through (N+3), wherein the references of X, M, and N are merely intended to represent integers with values greater than 1 and not necessarily equal to any other X, M, and N references herein. Page table entries are established for the pages of the SSD 105 in the operating system 111 and allow the CPU 101 to determine whether a page is available in the DRAM 104. For example, pages that are available in the DRAM 104 have a "present" bit 302 established as a logical "1" in the operating system 111 so as to point to the correct valid page in the DRAM 104. If the page is not present in the DRAM 104, the present bit 302 established as a logical "0" in the operating system 111 showing that the page is invalid, thus directing the CPU 101 to retrieve the data from the SSD 105 when directed. If space exists in the DRAM 104, the CPU 101 may pull required data into the unused portions of the DRAM 104. Otherwise, the CPU will determine priorities of the regions of pages occupying the DRAM 104 to flush them to the SSD 105.

As exemplarily illustrated in this embodiment, the page table entries point the CPU 101 to the pages 0-7 in the DRAM 104 and thus the pages X through X+7 of the SSD 105. The remaining page table entries are marked as invalid which would direct the CPU 101 to pull data from the SSD 105 when needed, or vice versa. Initially, page table entries are marked as invalid such that the pages can be loaded on demand.

Figure 3A:
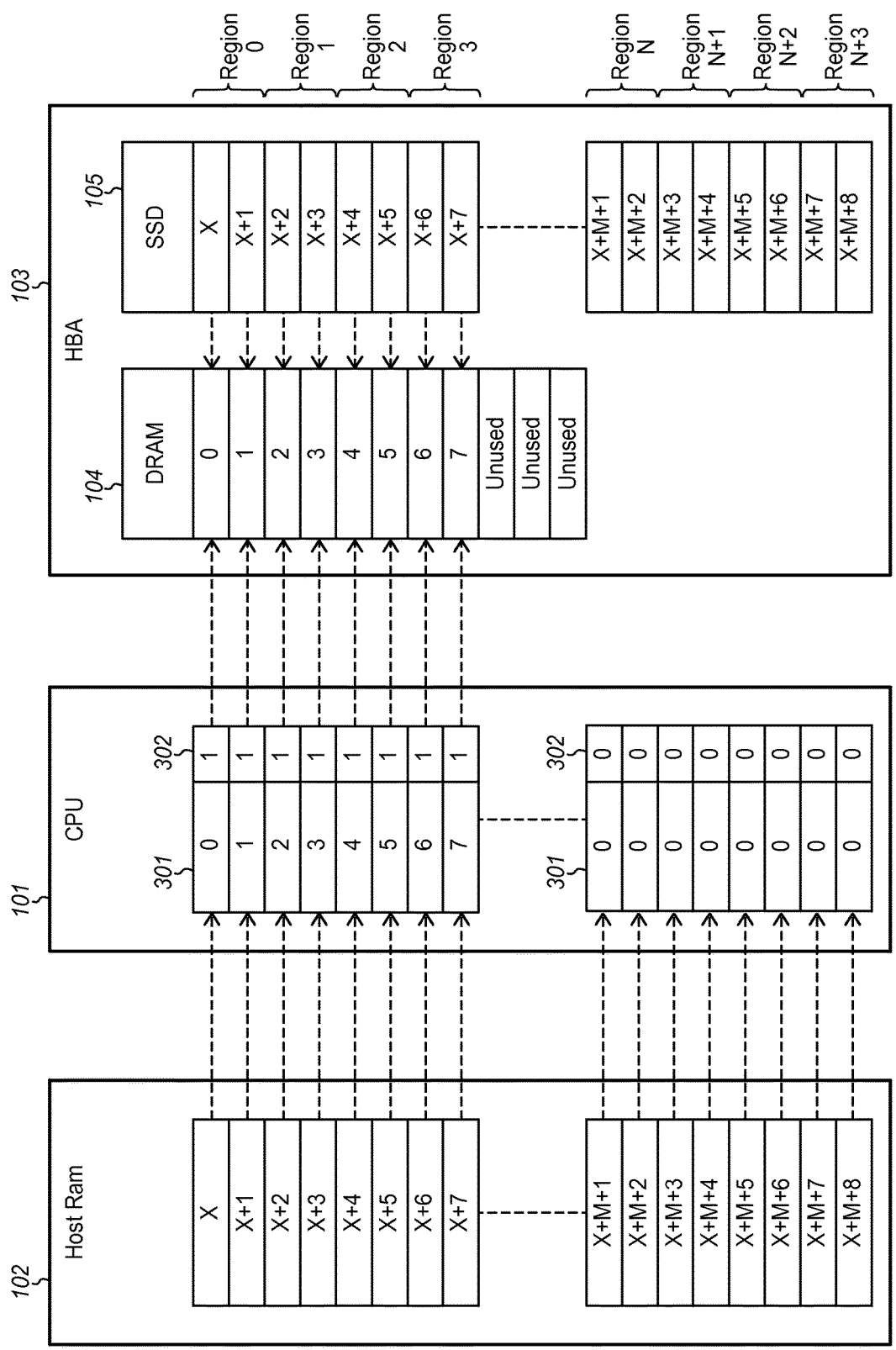
FIGS. 3A and 3B are block diagrams illustrating an exemplary mapping between host memory and memory of the HBA.
Figure 3B:
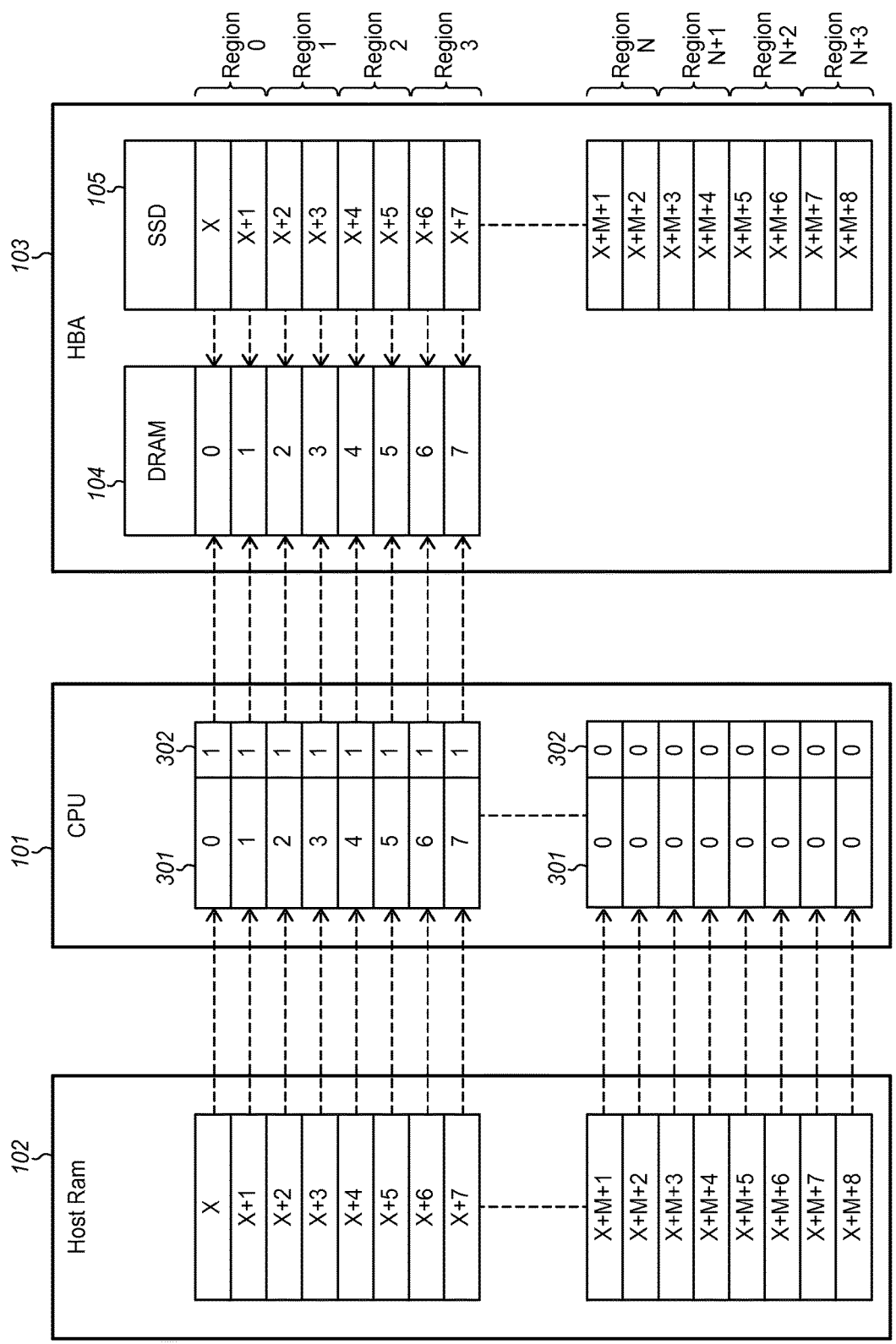

With this mapping established, access by the host applications to the pages present in the DRAM 104 and thus the SSD 105 are direct (e.g., direct memory access, or "DMA"). Thus, operations such as load/store operations of the operating system can bypass any operating system routine or protocol stack. And, when an application of the host system 100 accesses a page which is not present in the DRAM 104, the CPU 101 generates a page fault to the operating system 111. The operating system 111 handles the page fault by detecting that there exists unused portions of the DRAM 104 as illustrated in FIG. 3A, and hence proceeds to directly load the requested region from the SSD 105 into the unused region in DRAM 104. However, if there are no unused portions, as illustrated in FIG. 3B, the CPU 101 also generates a page fault to the operating system 111 but the operating system 111 handles the page fault by replacing a region from the DRAM 104 and loading the requested region from the SSD 105 into the DRAM 104. This replacement is performed based on prioritization of the regions of the SSD 105.

One exemplary UNIX operation that may be used to implement the mapping is illustrated below:

```
int fd = open ("/dev/<device name>", O_WR,0);
char *ext_nv_ptr = (volatile char*) mmap (NULL,
<Ext.NVDRAM size>, PROT_WRITE, MAP_SHARED, fd, <offset>);
    ext_nv_ptr[offset] = <value>; /*sets <value>
    at Ext.NVDRAM location <offset> */
unmap (ext_nv_ptr, <EXT_NVDRAM_SIZE>);
close(fd);
```

This operation exposes the extended NVDRAM as a character device by the operating system 111. The application then maps a device into its address space such that the CPU 101 can directly read/write to any location in the extended NVDRAM space by load/store or memcpy/memset operations of the operating system 111.

Now, when an application of the operating system 111 attempts to access a page of the extended NVDRAM (i.e., the DRAM 104 and the SSD 105) which is currently not available, the requested region holding the page needs be loaded from the SSD 105 to the DRAM 104. If the DRAM 104 is currently filled with regions, then an existing region needs to be selected from the DRAM 104 (i.e., a region of the SSD 105) and moved to the SSD 105. The requested page (and other pages belonging to the region of the requested page) is then transferred in its place from the SSD 105 to the DRAM 104.

Different applications of the operating system 111 may have different uses for data and therefore may prioritize regions in different ways. In one embodiment, the applications themselves indicate to the operating system 111 relative priorities and replacement algorithms of the regions to replace pages in the DRAM 104. Some examples of UNIX applications to replace pages are now illustrated.

ext_nvdram_memory_priority (fd, <memory range>, <priority level>)

In this embodiment, the application establishes the priority based on 32 possible values of 0 to 31. The priority indicates the relative importance of the regions represented by the range of the DRAM 104 over other regions.

ext_nvdram_priority_pool size (fd, <priority level>, <number of regions>)

In this embodiment, the application establishes a maximum number of regions in each priority level. By default, the number of regions in the DRAM 104 is divided equally among all priority levels.

---
ext_nvdram_region_pool_policy (fd, <priority level>, LRU | <MRU | Read-Ahead | FIFO | Background-Clean)
---

In this embodiment, the application establishes the policy of region replacement in each priority level. LRU replaces regions based on a least recently used region policy and MRU replaces regions based on a most recently used region policy. If the architecture of the CPU 101 does not support LRU and MRU replacement policies, then a FIFO replacement policy may be defaulted to, with regions being replaced in the order they are loaded. Read Ahead replacement can be established if the extended NVDRAM should load a next region after loading a current region requested by a page fault. A Background Clean policy enables a background task to flush dirty regions to the SSD 105 (dirty regions being those not yet written to long-term storage).

The extended NVDRAM driver in the operating system 111 maintains a table to keep track of different priority levels for each region. Thus, when an application establishes a priority of a memory range using ext_nvdram_memory_priority, the extended NVDRAM driver finds regions corresponding to this memory range. For example, the start region may be found as follows:

start region=start memory range/region size.
And, the end region may be found as follows:
end region=end memory range/region size.

Figure 5:
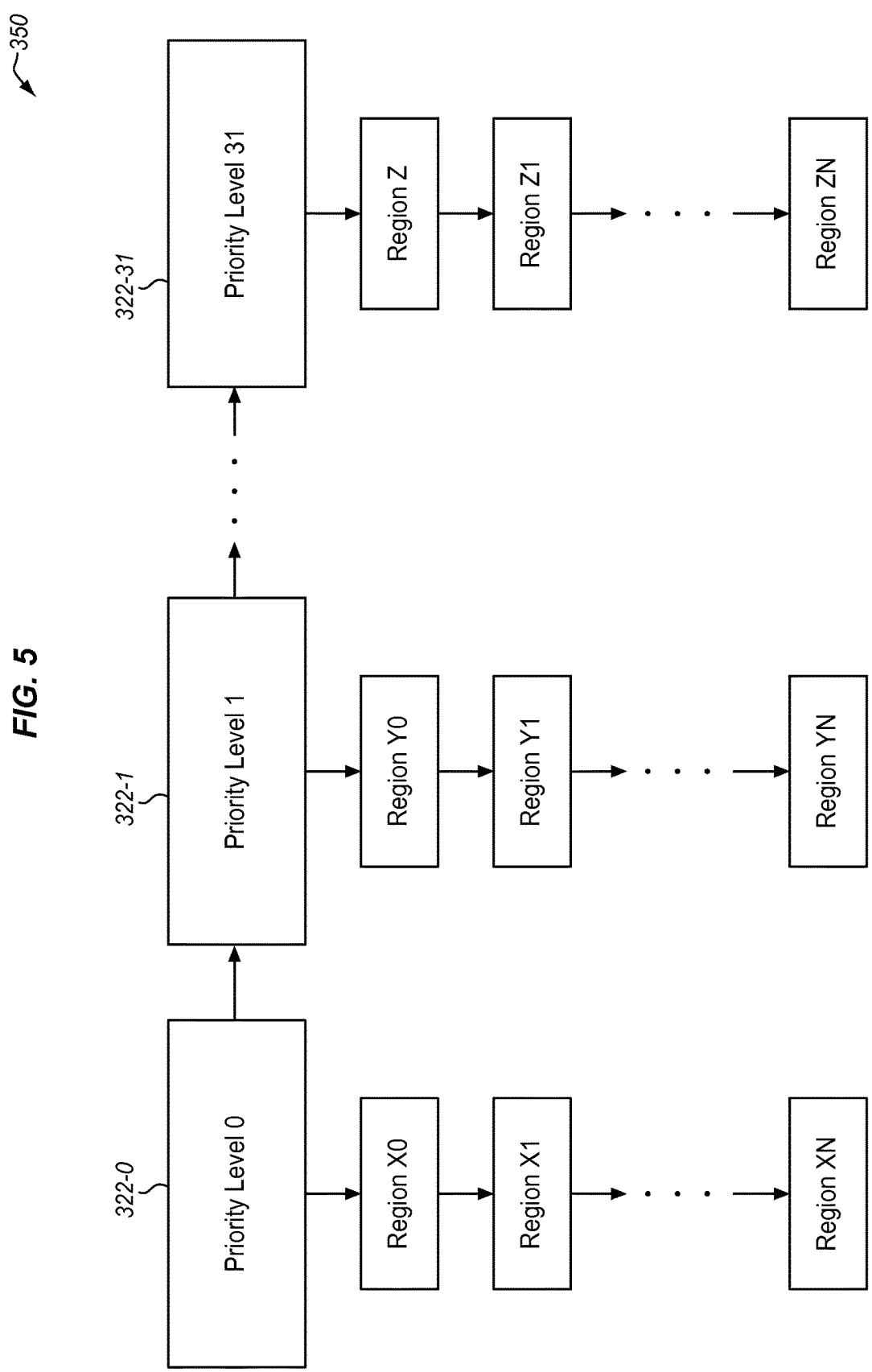
FIG. 5 is a block diagram illustrating an exemplary pooling of prioritized regions of the memory of the HBA.

Then, the priority of the region (starting from the start region until the end region) is set to the values provided by the application. When a page fault happens, the region is calculated from the memory range of the DRAM 104 in a similar way that it is looked up in the table to find a priority pool to which the region belongs, as illustrated in the table 320 of FIG. 4. For example, each region has a range of pages 321 spanning the region. And, each region may be associated with a priority level 322 established by the application. As shown in FIG. 5, the operating system 111 may also maintains pools 350 for the region priority levels 322. Thus, priority levels 322 of the contiguous regions can be readily identified based on their respective priority pools. For example, some contiguous regions may have the same priority levels and as such they are pooled together, such as priority level 0 (e.g., a default priority level) comprising contiguous regions X0-XN, priority level 1 comprising contiguous regions Y0-YN, . . . through priority level 31 comprising contiguous regions Z0-ZN (e.g., wherein the references of X, Y, and Z are merely intended to represent integers with values greater than 1 and not necessarily equal to any other X, Y, and Z references herein).

The pools 350 provide the CPU 101 with a way to traverse through and identify the priority level of any given region. For example, during a page fault, the CPU 101 determines whether the requested region can be loaded without any region replacement. If there is space in the DRAM 104, the CPU 101 loads a region from the SSD 105 into the DRAM 104. Otherwise, in response to a page fault, the CPU 101 traverses each priority level pool (e.g., starting from the lowest to the highest priority) and selects a region from the selected pool based on the replacement policy within the given priority level. The CPU 101 then transfers the region to the SSD 105 and subsequently transfers the requested region causing the page fault from the SSD 105 into the DRAM 104.

To further illustrate, if a requested region is in a priority 2 pool and there is no free space in this pool, the space may be acquired from an unallocated/free region in the priority 1 pool, a lower priority pool. The CPU 101 then determines whether the free region from the priority 1 pool should be acquired based on the priority levels as well as the policy decisions of the priority pools, such as a threshold of the minimum number of regions to maintain within a given priority pool, etc.

Now, assuming that the request is for a region in a priority 1 pool and that only the priority pool 31 (i.e., a higher priority pool) has an unallocated/free region and all other priority pools have regions that are already allocated. The CPU 101 determines whether the unallocated/free region of the priority pool 31 should be allocated to the request for the region made for the priority 1 pool based on the priority levels as well as the policy decisions of the pools (e.g., the above mentioned threshold, determinations on whether to honor requests from lower priority pools, and if so, how many, etc.). As the priority pool 31 is higher, the request may be made to acquire that space if there are currently no transactions pending or occurring for that space. Alternatively, the applications of the operating system 111 can change a priority level of a region at any time as previously mentioned. This directs the operating system to move a changed region to its newly designated priority pool.

If no free regions exist in the DRAM or if the policy of the priority pools with free regions does not allow the free region in the corresponding pool to be allocated (e.g., based on the priority of the pool from which the request originated), the operating system 111 handles a page fault by directing the CPU 101 to identify the priority of the particular requested region, and find a lower priority region that may be replaced. To further illustrate, if a requested region is in priority 5 pool and no free space exists that can be allocated from any pool, the CPU 101 then determines whether the allocated region from the priority 1 pool should be replaced based on the priority levels as well as the policy decisions of the pools (e.g., the above mentioned threshold, etc.). If this is not possible, the CPU 101 attempts to identify free space in the next priority pool until it reaches the original priority pool of the requested region (in this case, the priority 5 pool). Using this procedure, a suitable region in a lower priority pool or the same priority pool may be chosen for replacement.

In another embodiment, the extended NVDRAM driver in the operating system 111 may perform dirty region flush operations or read ahead operations depending on a particular policy chosen by the application. This is handled by launching a background task that performs the operation. In the case of a dirty region flush, a page table entry for a page about to be written is marked as dirty. If the Background-Clean option is selected by the application in the region policy for the pool to which the page belongs, the page is then written to the SSD 105. In the case of a read ahead, the background task starts the read operation on the next region that is physically contiguous on the SSD 105. Examples of the applications are as follows (" . . . " indicating other operations that may be performed in between):

```
ext_nvdram_region_pool_policy(fd,<priority level 1>, LRU);
ext_nvdram_region_pool_policy(fd,<priority level 2>, MRU | Read_Ahead);
ext_nvdram_region_pool_policy(fd,<priority level 3>, LRU);
...
ext_nvdram_region_pool_size(fd,<priority level 1>, number of regions);
ext_nvdram_region_pool_size(fd,<priority level 2>, number of regions);
ext_nvdram_region_pool_size(fd,<priority level 3>, number of regions);
...
ext_nvdram_memory_priority(fd,<memory range 1>, ,<priority level 1>);
ext_nvdram_memory_priority(fd,<memory range 2>, ,<priority level 2>);
ext_nvdram_memory_priority(fd,<memory range 3>, ,<priority level 3>);
...
    char *ext_nv_ptr = (volatile char*) mmap (NULL, <Ext.NVDRAM size>,
PROT_WRITE, MAP_SHARED, fd <offset>);
...
    ext_nv_ptr [offset] = <value>; /* sets <value> at Ext.DRAM location <offset> */
...
unmap (ext_nv_ptr, <EXT_NVDRAM_SIZE>);
close(fd);
```

The above embodiments provide certain advantages over the prior art, such as allowing the system to run large database transfers and their associated logs in a type of NVDRAM environment. For example, the applications described herein provide an interface for placing large database files and their associated log files into the extended NVDRAM embodiments above. The larger data accesses may be random but log accesses are mostly sequential. Thus, the extended NVDRAM may be divided into two priority levels, one for data and the other for logs. The priority level of the regions holding the logs would be lower compared to that of the data as the data is typically more important. The replacement policy for the regions holding logs could then be set to MRU and the replacement policy for the regions holding the larger associated data files could then be set to LRU. But, the region replacement policies could also be based on access patterns. And, of course, any number of priority levels may be used as a matter of design choice.

It should be noted that the invention is not intended be limited to any particular number of pages or regions. Additionally, replacement algorithms for replacing pages in the DRAM 104 based on priorities may be performed in a variety of ways as a matter of design choice. And, although shown and described with respect to one exemplary UNIX operating system, the embodiments shown and described herein may be implemented in a variety of operating systems 111 as a matter of design choice. A few examples of other operating systems in which the embodiments herein may be employed include Microsoft Windows, Apple operating systems, and Linux.

Figure 6:
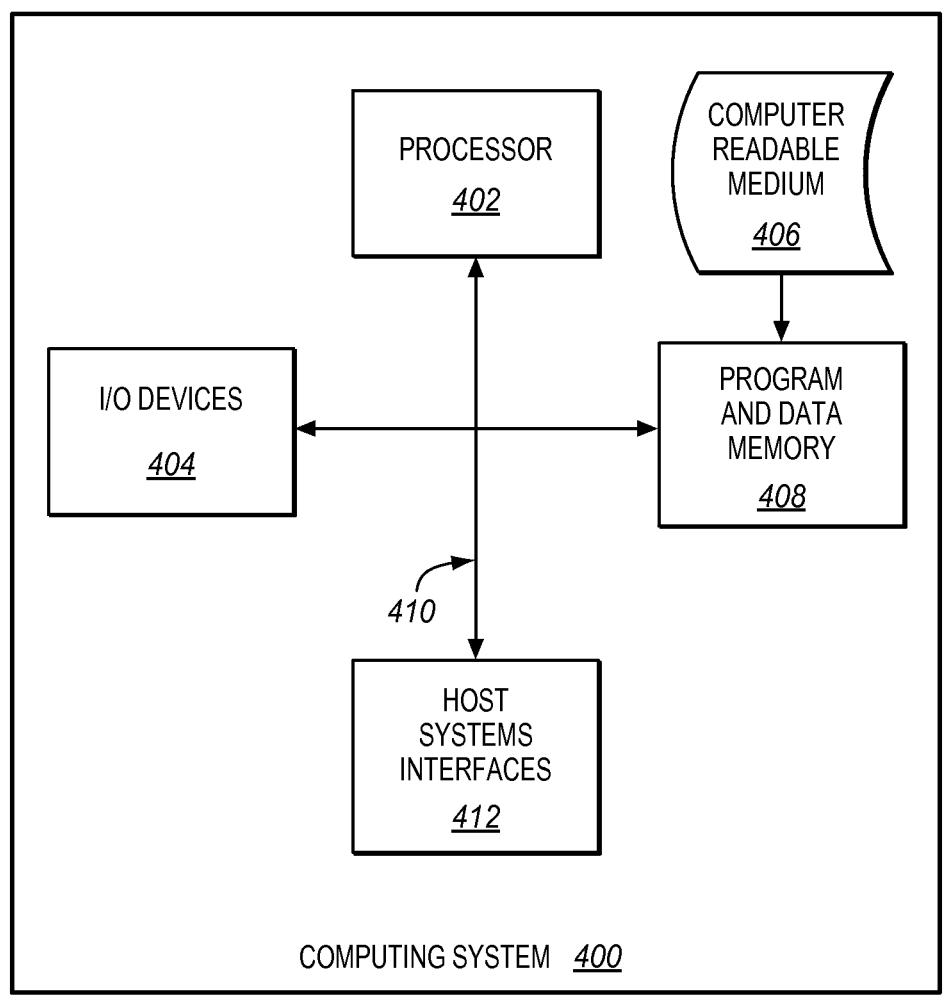
FIG. 6 illustrates an exemplary computer system operable to execute programmed instructions to perform desired functions.

Additionally, the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A system, comprising:
a host processor;
a host memory communicatively coupled to the host processor and sectioned into pages;
a host bus adapter (HBA) communicatively coupled to the host processor and comprising a Dynamic Random Access Memory (DRAM) and a Solid State Memory (SSD) for cache operations and
an HBA driver operable on the host processor,
wherein the DRAM is sectioned into pages mapped to pages of the host memory and the SSD is sectioned into pages mapped to pages of the DRAM,
wherein the SSD is further sectioned into regions comprising one or more pages of the SSD, and
wherein the HBA driver is operable to load a page of data from the SSD into a page of the DRAM when directed by the host processor, to determine that the page of the DRAM is occupied with other data, to determine a priority of a region of the page of the other data occupying the page of the DRAM, and to flush the other data from the DRAM to the SSD based on the determined priority.

2. The system of claim 1, further comprising:
a storage device comprising an operating system executable by the host processor, wherein the operating system comprises an application that is operable to change priorities of the regions of the SSD.

3. The system of claim 1, wherein:
the SSD maintains data of the DRAM during a power outage.

4. The system of claim 2, wherein:
the storage device comprises a table of the priorities of the regions; and
the HBA driver is further operable to direct the host processor to periodically access the list to automatically determine the priorities of the regions.

5. The system of claim 2, wherein:
the operating system is operable to direct the processor to generate a page fault an application running on the host processor attempts to load the page of data into the DRAM and determines that the data is not in the DRAM.

6. The system of claim 5, wherein:
the page fault directs the HBA driver to determine that the priority of the page being attempted for loading into the DRAM comprises data in a region that is higher than the page of data currently occupying the DRAM; and
in response to determining that the priority is higher, the HBA driver writes the page of data currently occupying the DRAM to the SSD.

7. The system of claim 5, wherein:
the page fault directs the HBA driver to determine that the priority of the page being attempted for loading into the DRAM comprises data in a region that is lower than the page of data currently occupying the DRAM; and
in response to determining that the priority is lower, the HBA driver determines a priority of a next physical region and loads the page being attempted for loading into the DRAM into a page of the next physical region.

8. A method operable in a host system comprising a host processor, a host memory, a host bus adapter (HBA), and an HBA driver, the HBA comprising a Dynamic Random Access Memory (DRAM) and a Solid State Memory (SSD) for cache operations, the method comprising:
sectioning the host memory into pages;
sectioning the DRAM into pages;
sectioning the SSD into pages and regions, with each region of the SSD comprising one or more pages of the SSD;
mapping the host memory pages to the DRAM pages;
mapping the pages of the DRAM to the pages of the SSD to provide the host processor with direct access to the pages of the SSD through the DRAM;
loading a page of data from the SSD into a page of the DRAM when directed by the host processor;
determining that the page of the DRAM is occupied with other data; determining a priority of the region of the page of other data occupying the page of the DRAM; and
flushing the other data from the DRAM to the SSD based on the determined priority.

9. The method of claim 8, further comprising:
changing priorities of the regions of the SSD via an application of an operating system directing the host processor.

10. The method of claim 8, further comprising:
maintaining data of the DRAM in the SSD during a power outage.

11. The method of claim 9, further comprising:
maintaining a table of the priorities of the regions; and
periodically accessing the list to automatically determine the priorities of the regions.

12. The method of claim 9, further comprising:
generating a page fault when an application running on the host processor attempts to load the page of data into the DRAM and determines that the data is not in the DRAM.

13. The method of claim 12, further comprising:
in response to generating the page fault, determining that the priority of the page being attempted for loading into the DRAM comprises data in a region that is higher than the page of data currently occupying the DRAM; and
in response to determining that the priority is higher, writing the page of data currently occupying the DRAM to the SSD.

14. The method of claim 12, further comprising:
in response to generating the page fault, determining that the priority of the page being attempted for loading into the DRAM comprises data in a region that is lower than the page of data currently occupying the DRAM;
in response to determining that the priority is lower, determining a priority of a next physical region; and
loading the page being attempted for loading into the DRAM into a page of the next physical region.

15. A non-transitory computer readable medium comprising instructions that, when directed by a processor in a host system comprising a host memory, a host bus adapter (HBA), and an HBA driver, the HBA comprising a Dynamic Random Access Memory (DRAM) and a Solid State Memory (SSD) for cache operations, direct the processor to:
section the host memory into pages;
section the DRAM into pages;
section the SSD into pages and regions, with each region of the SSD comprising one or more pages of the SSD;
map the host memory pages to the DRAM pages;
map the pages of the DRAM to the pages of the SSD to provide the host processor with direct access to the pages of the SSD through the DRAM;
load a page of data from the SSD into a page of the DRAM when directed by the host processor;
determine that the page of the DRAM is occupied with other data;

determine a priority of the region of the page of other data occupying the page of the DRAM; and flush the other data from the DRAM to the SSD based on the determined priority.

16. The computer readable medium of claim 15, further comprising instructions that direct the processor to:

change priorities of the regions of the SSD via an application of an operating system.

17. The computer readable medium of claim 16, further comprising instructions that direct the processor to:

maintain a table of the priorities of the regions; and periodically access the list to automatically determine the priorities of the regions.

18. The computer readable medium of claim 16, further comprising instructions that direct the processor to:

generate a page fault when an application running on the host processor attempts to load the page of data into the DRAM and determines that the data is not in the DRAM.

19. The computer readable medium of claim 18, further comprising instructions that direct the processor to:

in response to generating the page fault, determine that the priority of the page being attempted for loading into the DRAM comprises data in a region that is higher than the page of data currently occupying the DRAM; and in response to determining that the priority is higher, right the page of data currently occupying the DRAM to the SSD.

20. The computer readable medium of claim 18, further comprising instructions that direct the processor to:

in response to generating the page fault, determine that the priority of the page being attempted for loading into the DRAM comprises data in a region that is lower than the page of data currently occupying the DRAM;

in response to determining that the priority is lower, determine a priority of a next physical region; and load the page being attempted for loading into the DRAM into a page of the next physical region.

* * * * *